United States Patent [19]

Mayrl

[11] 4,181,696

[45] Jan. 1, 1980

[54] SLIP-CASED CORE-FORMING MANDREL

[76] Inventor: Jose A. Mayrl, Centenario 1222, San Pedro Garza Garcia, N. Leon, Mexico

[21] Appl. No.: 873,186

[22] Filed: Jan. 30, 1978

[30] Foreign Application Priority Data

Nov. 28, 1977 [MX] Mexico .................................. 171488

[51] Int. Cl.² .............................................. B28B 21/06
[52] U.S. Cl. ..................................... 264/166; 425/64; 425/89; 425/107; 425/364 R; 425/460
[58] Field of Search .................... 264/33, 166; 425/59, 425/63–65, 89, 460, 468, 107, 364

[56] References Cited

U.S. PATENT DOCUMENTS

| 231,537 | 8/1880 | Codding | 264/33 |
| 857,586 | 6/1907 | Boyle | 425/59 |
| 2,209,726 | 7/1940 | Fleming | 425/63 |
| 2,618,832 | 11/1952 | Zschokke | 425/59 |

Primary Examiner—John McQude
Attorney, Agent, or Firm—Nilsson, Robbins, Dalgarn, Berliner, Carson & Wurst

[57] ABSTRACT

In forming settable mix into hollow-cored articles, cantilevered hollow core-forming mandrels are disposed in a mold station, each mandrel being wrapped in a flexible, non-porous casing formed as an endless loop slipcase which encloses the exterior and interior mandrel walls. Movement of the mix moves the casing along the longitudinal mandrel axis rotating it around the exterior and interior mandrel walls, thereby preventing the accretions of settable material on the mandrel.

38 Claims, 11 Drawing Figures

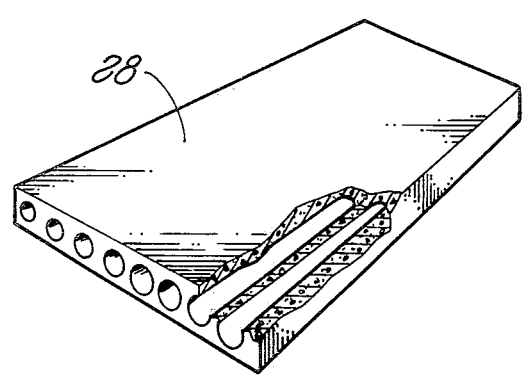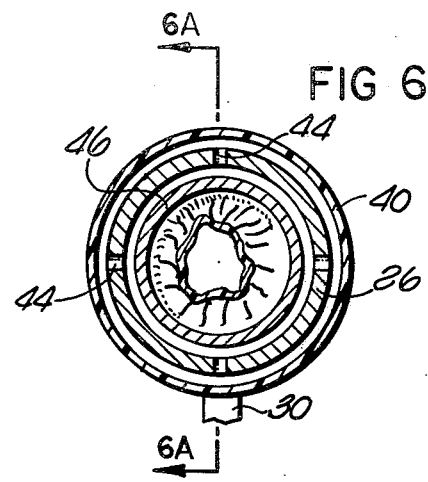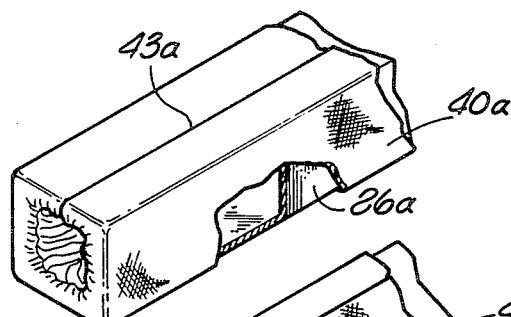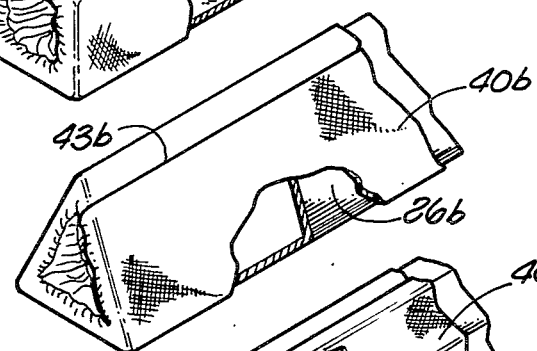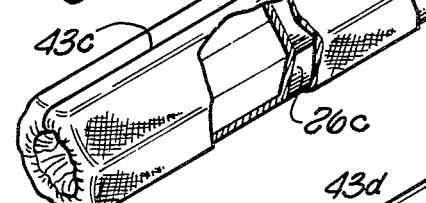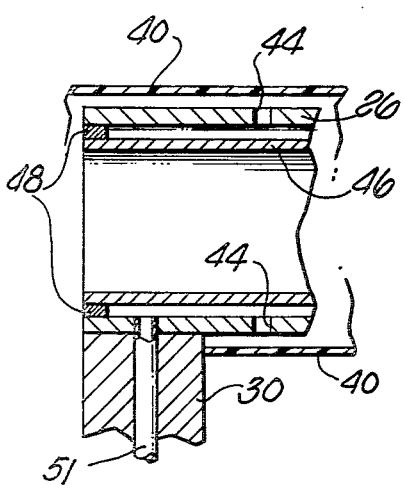

SLIP-CASED CORE-FORMING MANDREL

FIELD OF THE INVENTION

The field of art to which the invention pertains includes the field of extruding.

BACKGROUND AND SUMMARY OF THE INVENTION

The extensive use of pre-cast, hollow-cored forms makes it a desirable object to produce the units as efficiently and economically as possible in an automated process with a minumum of down-time for repairs or maintenance. This object is thwarted to a considerable extent by the fact that most settable materials in the flowable state have a tendency to adhere to the surface walls of a mold. The result is uneven compaction of the material in the neighborhood of the wall surfaces which can produce cavities and fissures in the finished article. Inhomogeneties are increased if the mold includes core-forming mandrels with walls which increase the adhesion areas. The accretions of irregular masses of settable material on stationary mandrels change the cross-sectional shape and the dimensions of the cores so that the mandrels have to be cleaned at frequent intervals. The process of taking off the excess material is time and labor consuming and interrupts the continuity of article production. These problems manifest themselves in the formation of forms from materials as diverse as concrete or other cementitious material, chip-board, particle boards, ceramics, organic polymers, foams, paper, powdered and sintered metals, glass.

It is the purpose of the present invention to prevent, through novel means, the accretion of these materials on surfaces disposed in the interior of a mold and more particularly, on the surface walls of core-forming mandrels which are arrayed in a mold station. The process is exemplified, for purposes of disclosure, with cementitious material such as concrete for forming pre-cast concrete slabs. Conveniently, a flowable concrete mix is discharged from a hopper into the casting mold station, the bottom wall of which is defined by a moving conveyor belt which removes the formed mix at a continuous rate to be cured, cut and stored for future use. In accordance with the present invention, a hollow, slip cased cantilever mandrel is provided. Movement of the material out of the mold station is accompanied by a parallel movement along the exterior mandrel walls. For this purpose, each mandrel is wrapped in a casing made from a sheet of flexible material. The sheet is formed from an initially rectangular shape and is preferably non-porous. The sheet is passed through the cavity defined by the interior mandrel walls, carried rearwardly to a turning station idler roller, folded back over the exterior walls, and made into an endless tubular loop by fastening its ends to one another. As the mix is discharged from the hopper the movement of the conveyor belt moves the mix thereby causing the casing at the exterior of the mandrel to advance in the direction of movement of the conveyor belt whereby the mix moves the casing in the interior of the mandrel in the opposite direction. Supplementary moving force can be provided, if needed, by a driving roller pulling the sheet against the idler roller.

The longitudinal edges of the sheet wrapping the mandrel overlap, but the edges are unconnected so as to permit the temporary production of a gap between the sheets. The gap permits the mounting for the cantilevered mandrel to be passed by the sheet. A guide disposed downstream of the gap closes the slip between the sheet ends and restores their overlapping relation. The mass of the poured material maintains the sheet edges in overlapped relation.

The motion of the mandrel casing relative to the mandrel prevents the accretion of settable material on the mandrel itself. The periodic flexing of the casing during its rotation about the exterior and interior mandrel walls counteract any build-up of concrete thereon. Any accumulation of hardened material is transient and can be easily washed away, for example, by a play of water on the upstream side of the casing. Accordingly, the mandrel casing can be cleaned without stopping the slab-forming process.

The casings may be made conformable with mandrels of diverse cross-sectional shapes such as may be required for cores serving as pipe shafts, ventilating ducts and other purposes. Each casing may be constructed from an integral sheet, or from individual elongated strips which are joined to each other in place on the mandrel.

In an embodiment of the present invention, the mandrels include along their length a plurality of apertures for communication between the interior and exterior thereof. Air or a liquid under pressure can be introduced into the cavity, e.g., by a secondary tube therethrough so that the fluid is forced outwardly through the apertures, forming a low friction or cooling medium between the exterior mandrel walls and the casing rotating thereon.

BRIEF DESCRIPTION OF THE DRAWINGS

FIG. 5 is a perspective view, partly broken away, of an article formed in accordance with the present invention;

FIG. 6 is a cross-sectional view of a mandrel in accordance with another embodiment of the present invention;

FIG. 6A is a cross-sectional view of the mandrel of FIG. 6 in the direction of the arrows;

FIG. 7A, 7B and 7C are schematic perspective views of end sections of mandrels of diverse cross-sectional shapes in accordance with further embodiments of the invention; and FIG. 7D is a perspective view of the end section of a mandrel and casing, constructed in accordance with still another embodiment of the present invention.

DETAILED DESCRIPTION

Figure 1:
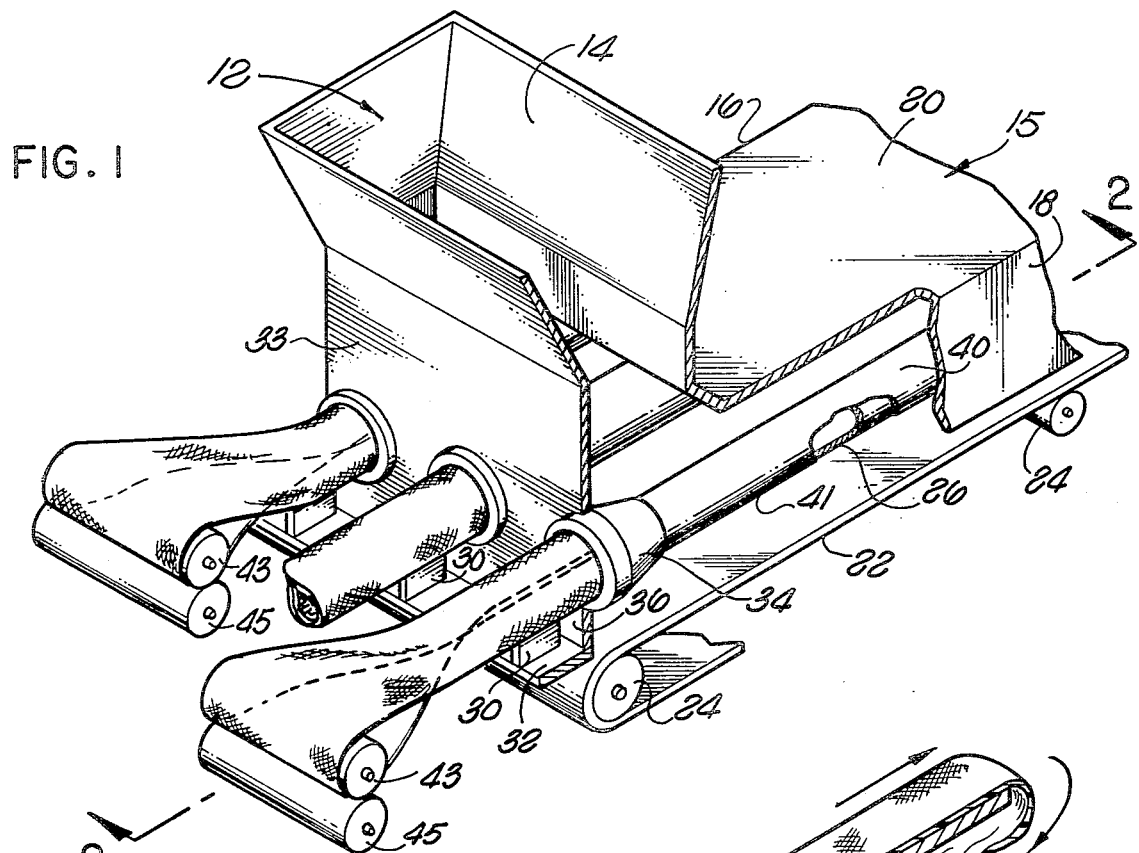
FIG. 1 is a perspective view, partly broken away, of an apparatus for forming hollow-cored articles in accordance with the present invention.
Figure 3:
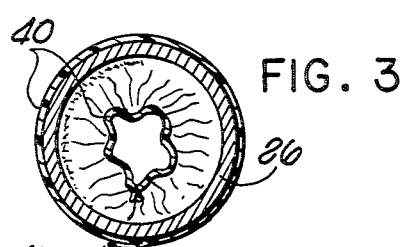
FIG. 3 is a cross-sectional view of a mandrel taken along the line of 3—3 of FIG. 2.
Figure 2:
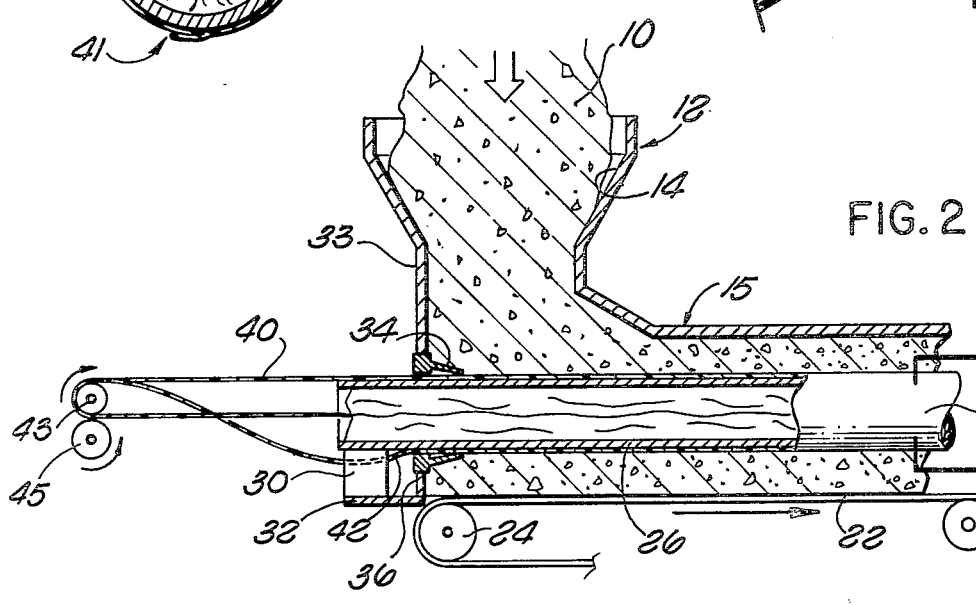
FIG. 2 is a cross-sectional view, partly broken away, taken along the line of 2—2 of FIG. 1.

Referring to FIGS. 1, 2 and 3, there is shown an apparatus for producing from a concrete mix 10 (not shown in FIG. 1 for clarity) articles exemplified by hollow-cored elongated slabs. The apparatus includes a hopper 12 with a chute 14 through which the mix 10 from a source (not shown) is discharged or forced into a mold station 15 whose length, in this particular apparatus (but not necessarily) is greater than its width. The mold station 15 is defined by a pair of side walls 16 and 18 which are connected by a top wall 20 formed integrally with a portion of the chute 14. An endless conveyor belt 22 defines a bottom wall of the mold station and is parallel with the top wall 20 and spaced therefrom to define within the top wall 20 and side walls 16 and 18 the contours of an elongated slab. The belt 22 is trained over rollers 24 and is driven in the direction of the arrow of FIG. 2. The conveyor belt 22 carries partly solidified mix from the mold station 15 to a curing or storing area. Initially, a bait is used to move the mix from the hopper 12 to a cutting station (not shown) and thereafter the article is continuously pulled along the conveyor belt by motor driven rollers or the like (not shown) or by any other conventional means.

The mold includes at least one hollow, open-ended core-forming mandrel 26 which is disposed parallel, and spaced from, the conveyor belt 22 and top mold station wall 20. The mandrel 26 of this embodiment has a circular cross-section and a longitudinal axis is aligned with the length of the mold station 15. The mold station 15 may have any desired shape and may accommodate any selected number of mandrels 26, depending on the specifications for the finished article. FIG. 1 shows, for example, three mutually parallel spaced apart mendrels out of eight mandrels indicated by the eight cores of the article 28 of FIG. 5.

The mandrel 26 includes a longitudinal end portion which is cantilevered to project outwardly into the mold station. A narrow, aligned, rectangular cantilevering strut 30 is secured at its top, as by welding, to the upstream end of the mandrel. At its bottom, the strut 30 is attached to a plane bar 32 which, in turn, is secured by conventional means such as by bolts or welding to the adjacent rear wall 33 of the chute 14. In an apparatus containing several mandrels 26, the bar 32 extends across the entire width of the wall 33 to interconnect the lower ends of the parallel struts 30 to which the mandrels are cantilvered.

A suitably shaped sleeve 34 for each mandrel 26 is superposed on the longitudinal end portion of the mandrel 26 downstream but adjacent the strut 30 and is supported at its larger end in an opening 36 therefor formed in the rear wall 33 of the chute 14.

A casing 40, which, in the embodiment, is made from a substantially flexible material such as nylon reinforced polyvinylchloride, of predetermined tensile strength and thickness is axially rotatable about the mandrel 26. In order to form the casing 40, the mandrel 26 is demounted and laid on top of the sheet. The sheet is folded over one of the outer ends of the mandrel and pulled back through its interior, until the opposite transverse sheet end portions are contiguous and can be joined to each other by heat-welding, sewing or similar convenient methods. The casing 40 formed in this way, fits about the mandrel 32 which can then be remounted. The casing is large enough so as to permit looping around an idler roller 43 spaced rearwardly from the upstream end of the mandrel 26. In this regard, each mandrel has associated with it a similar idler roller, the rollers being spaced one from the other in staggered manner to avoid interference one with the other. The endless loop passing in one direction over the exterior of the mandrel, and in the opposite direction through its interior, includes parallel longitudinal side portions which overlap each other at 41, but which are not conjoined (FIGS. 1 and 3).

The separability of the longitudinal side portions of the casing 40 permits the production of a temporary gap 42 during the casing's rotation so that the strut 30 on the mandrel 26 can be by-passed on the opposite sides. Downstream of the strut 30, the split-apart sides of the flexible casing material are passed through the conical sleeve 34 which closes the gap 42 and returns the separated sides to their overlapping relation. The disposition of the strut 30 at the exterior of the mold station prevents the accidental entrainment of the mix into the space formed between the casing 40 and the exterior wall of the mandrel 26.

Figure 4:
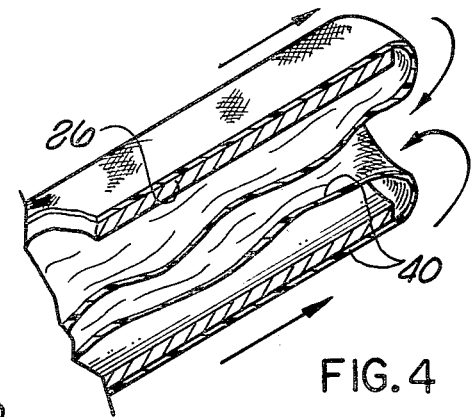
FIG. 4 is an enlarged, perspective view, partly broken away, of a portion of the casing enwrapping the core-forming mandrel shown in FIG. 2.

Referring to FIGS. 2 and 4, movement of the mix 10, represented by the arrows of FIG. 2, is produced by movement of the conveyor belt 22 as well as of the casing 40 on the exterior of the mandrel in the direction of the arrows of FIG. 4, parallel with the direction of the conveyor belt 22. As a result, the casing 40 is also entrained in the interior of the mandrel in the opposite direction. Movement of the casing 40 relative to the mandrel 26 prevents the accretion of settable material on the mandrel itself. Simultaneously, an accumulation of hardened material on the casing 40 is inhibited by the recurrent deflections of the material, as it is rotated between the exterior and interior mandrel wall surfaces. Movement of the mass of the mix 10 can serve to provide all the force required to move the casing. However, in some cases it may be desirable to supplement such force and this can be accomplished by use of a driving roller 45 as shown in FIG. 1. The driving roller 45 is rotated in the direction of the arrow by motor and acts in the casing via the idler roller 43 so as to (means not shown) aid in movement of the casing.

In an embellished embodiment of the invention, shown as FIG. 6 and 6A, a plurality of apertures 44 are provided in the walls of the mandrel 26, radially arrayed from the center of the mandrel along its entire length to permit communication between the interior and exterior of the mandrel. Fluid such as air or liquid under pressure may be introduced into the interior cavity by means of a secondary, interior tube 46 spaced from but close to the apertures 44. The fluid is forced outwardly through the apertures 44 to reduce friction between the casing 40 and the exterior wall of the mandrel 26 by providing a cushion between the proximate surfaces. The fluid may also, or alternatively, serve to cool the apparatus. The tube 46 is welded at its ends (such as at 48 in FIG. 6A). An opening is formed to the annular chamber between the tube 46 and mandrel 26 through the mandrel and adjacent supporting strut 30. A nipple 51 can be connected to a source of fluid (not shown).

Referring to FIG. 5, the article 28 shown is an example of a structure which can be manufactured using the apparatus and methods described above. For example, it can be a slab having a length of about 12 feet, a width of about 3 feet and a height of about 6.0 inches. The diameter of each core is about 4.25 inches and the layer of slab above and below the cores has a thickness of about 0.7 inch each.

Castings of different dimensions, including a variable number of cores of diverse cross-sectional shape may be produced by the same means. Several of the mandrel forms adapted to be used in the respective slabs are shown in FIG. 7A, 7B and 7C. In FIG. 7A, a mandrel 26A of rectangular cross-section is shown with a casing 40A of flexible organic polymer material having a overlap region 43a. In FIG. 7B, a mandrel 26B of triangular cross-section is shown with a flexible casing 40B having an overlap region 43B. In FIG. 7C, a mandrel 26C of hexagonal cross-sectional shape is shown with a flexible casing 40C having an overlap region 43C.

In the embodiment of FIG. 7D, a mandrel 26D of circular cross-section is shown having a casing 40D made from narrow strips 41 of sheet material which are connected lengthwise to each other with the exception of one unconnected pair 41A and 41B which overlap at 43D.

It will be appreciated that the invention as described above may take forms that are different from the specific illustrative embodiments disclosed. Therefore, specific structural and functional details are not to be interpreted as necessarily limiting, but as a basis for the claims which define the scope of the invention. n

I claim:

1. In an apparatus for forming a hollow-cored article from a settable mix including a mold station, means for moving said mix through said mold station and at least one core-forming mandrel is supported in the path of movement of said mix through said mold station, the improvement according to which said mandrel is hollow and open-ended and has exterior and interior wall surfaces and a longitudinal axis aligned with the longitudinal axis of said mold station, and including a casing on said mandrel formed as an endless loop, rotatable along the longitudinal axis of said mandrel around the exterior and interior wall surfaces of said mandrel wherein said mix moves cojointly with rotational movement of said casing, along said exterior mandrel wall surface, said casing moving in the interior of the mandrel in the retrograde direction.

2. The apparatus according to claim 1 including cantilever means connected to one end of said mandrel, fixedly projecting said mandrel into said mold station.

3. The apparatus according to claim 2 wherein said casing comprises a pair of overlapping, longitudinal side portions.

4. The apparatus according to claim 3 comprising a sleeve superposed on said one end of said mandrel adjacent said cantilever means.

5. The apparatus according to claim 1 in which said mandrel has a plurality of apertures formed therethrough for communication between the interior and exterior of said mandrel.

6. The apparatus according to claim 5 including means for introducing fluid through said apertures between proximate surfaces of said casing and mandrel.

7. The apparatus according to claim 6 in which said means for introducing fluid comprises a tube within said mandrel and closed with the ends thereof forming an annular chamber and an opening into said chamber for connection to a source of fluid.

8. The apparatus according to claim 1 including an idler roller spaced from one end of said mandrel and around which said casing passes in moving between the interior and exterior of said mandrel.

9. The apparatus according to claim 8 including a driving roller adjacent said idler roller for moving said casing therebetween.

10. The apparatus according to claim 1 wherein said casing is constructed from a substantially rectangular sheet.

11. The apparatus according to claim 1 wherein said casing is constructed from a plurality of narrow strips joined to one another to form a substantially rectangular sheet.

12. The apparatus according to claim 1 in which said mandrel is one of a plurality thereof spaced apart and mutually parallel.

13. The apparatus according to claim 1 wherein said mandrel is disposed in said mold station spaced from the top and bottom thereof.

14. The apparatus according to claim 1 wherein said mandrel has a circular cross-section.

15. The apparatus according to claim 1 wherein said mandrel has a triangular cross-section.

16. The apparatus according to claim 1 wherein said mandrel has a rectangular cross-section.

17. The apparatus according to claim 1 wherein said mandrel has a hexagonal cross-section.

18. A core former for use in apparatus for forming a hollow-cored article from settable mix comprising:
a hollow, elongated, open-ended, core-forming mandrel;
and a casing contacting the interior and exterior walls of said mandrel formed as a endless loop rotatable along the longitudinal axis of said mandrel around the exterior and interior walls of said mandrel.

19. The core-former of claim 18 in which said casing comprises a pair of overlapping, longitudinal side portions.

20. The core-former of claim 18 including cantilever means connected to one end of said mandrel for fixedly projecting said mandrel.

21. The core-former of claim 19 including a sleeve superposed on one end of said mandrel aligning said overlapping longitudinal side portions during movement of said casing relative to said mandrel.

22. The core-former of claim 18 in which said mandrel walls comprise a plurality of apertures formed therethrough for communication between the interior and exterior of said mandrel.

23. The core-former of claim 22 including a tube within said mandrel and closed with the ends thereof forming an annular chamber and an opening into said chamber for connection to a source of fluid.

24. The core-former of claim 18 including an idler roller spaced from one end of said mandrel and around which said casing passes in moving between the interior and exterior of said mandrel.

25. The core-former of claim 24 including a driving roller adjacent said idler roller for moving casing therebetween.

26. The core-former of claim 18 wherein said casing is constructed from a substantially rectangular sheet.

27. The core-former of claim 18 wherein said casing is constructed from a plurality of narrow strips joined to one another to form a substantially retangular sheet.

28. The core-former of claim 18 wherein said mandrel has a circular cross-section.

29. The core-former of claim 18 wherein said mandrel has a triangular cross-section.

30. The core-former of claim 18 wherein said mandrel has a rectangular cross-section.

31. The core-former of claim 18 wherein said mandrel has a hexagonal cross-section.

32. A method for making a hollow-cored article from a settable mix comprising the steps of:
enclosing at least one hollow elongated, open-ended core-forming mandrel in a casing contacting the interior and exterior wall surfaces thereof and which is in the form of an endless loop which is rotatable past said wall surfaces along the longitudinal axis of said mandrel;

positioning said mandrel in a mold station;

feeding said mix into said mold station and moving said mix relative to the wall surfaces of said mandrel out of said mold station in a first direction; and moving said casing on the exterior of said mandrel parallel to said first direction whereby said casing in the interior of said mandrel is moved in the retrograde direction.

33. The method of claim 32 in which said mandrel is one of a plurality of mutually parallel, spaced apart mandrels disposed in said mold station.

34. The method of claim 32 in which said casing has longitudinal side portions and including the step of overlapping said side portions on the exterior wall surface of said mandrel.

35. The method of claim 32 in which said mandrel comprises a plurality of apertures therethrough and including the step of introducing fluid through said apertures whereby to reduce friction between the proximate surfaces of said casing and said mandrel.

36. The method of claim 32 including the step of cantilevering said mandrel at one end thereof to project said mandrel into said mold station.

37. The method of claim 36 comprising the step of aligning overlapping longitudinal portions of said casing adjacent said one end of said mandrel during movement of said casing relative to said mandrel.

38. The method of claim 32 in which said settable mix is cementitious material.

* * * * *